United States Patent
Agrawal et al.

(10) Patent No.: US 11,321,294 B2
(45) Date of Patent: May 3, 2022

(54) DATABASE INDEX REPAIR

(71) Applicant: salesforce.com, inc., San Francisco, CA (US)

(72) Inventors: Rohit Agrawal, San Francisco, CA (US); Thomas Fanghaenel, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 137 days.

(21) Appl. No.: 16/565,401

(22) Filed: Sep. 9, 2019

(65) Prior Publication Data
US 2021/0073195 A1 Mar. 11, 2021

(51) Int. Cl.
*G06F 16/22* (2019.01)
*G06F 16/2453* (2019.01)
(Continued)

(52) U.S. Cl.
CPC ......... *G06F 16/2272* (2019.01); *G06F 16/21* (2019.01); *G06F 16/2282* (2019.01); *G06F 16/2343* (2019.01); *G06F 16/2453* (2019.01)

(58) Field of Classification Search
CPC ............. G06F 16/2272; G06F 16/2282; G06F 16/2453; G06F 16/21; G06F 16/2343
(Continued)

(56) References Cited

U.S. PATENT DOCUMENTS

| 5,551,027 | A | * | 8/1996 | Choy | ............... G06F 9/355 |
| 6,507,847 | B1 | * | 1/2003 | Fleischman | ......... G06F 16/2255 |
| | | | | | 707/704 |

(Continued)

FOREIGN PATENT DOCUMENTS

| AT | 388046 B | 12/2020 |
| AU | 2018290758 B2 | 8/2020 |

(Continued)

OTHER PUBLICATIONS

Pg:Reindex—rebuild postgresql indexes concurrently without locking, metacpan.org, Binary.com, https://metacpan.org/pod/Pg::Reindex, 7 pages. [Retrieved Sep. 23, 2019].
(Continued)

*Primary Examiner* — Syling Yen
(74) *Attorney, Agent, or Firm* — Kowert, Hood, Munyon, Rankin & Goetzel, P.C.

(57) ABSTRACT

A computing system may repair a database index for a database table by placing a first structural lock on the database table to prevent modifications to the structure of the table. The computing system may scan the database table to determine a plurality of database records. The system may probe the database index for the database records to identify records with missing entries in the index. Based on the probing, the system may place a first data lock on a record of the database table corresponding to a missing index entry to prevent modification of data in the record. In response to placing the first record lock, the system adds an index entry for the locked database record to the database index. During repair of the index, one or more processes may use the database index to locate one of the plurality of database records included in the database table.

20 Claims, 10 Drawing Sheets

(51) Int. Cl.
*G06F 16/21* (2019.01)
*G06F 16/23* (2019.01)

(58) Field of Classification Search
USPC .......................................................... 707/781
See application file for complete search history.

(56) References Cited

U.S. PATENT DOCUMENTS

| | | | |
|---|---|---|---|
| 6,963,882 B1* | 11/2005 | Elko | ................ G06F 9/546 |
| 8,838,551 B2 | 9/2014 | Fanghaenel et al. | |
| 9,400,817 B2 | 7/2016 | Wildermuth | |
| 10,621,071 B2 | 4/2020 | Martin et al. | |
| 10,691,693 B2 | 6/2020 | Fanghaenel et al. | |
| 10,691,696 B2 | 6/2020 | Helland et al. | |
| 10,872,066 B2 | 12/2020 | Martin et al. | |
| 10,936,559 B1* | 3/2021 | Jones | ............... G06F 16/24562 |
| 2005/0246612 A1* | 11/2005 | Leis | .................. G06F 11/0727 |
| | | | 714/763 |
| 2007/0016754 A1* | 1/2007 | Testardi | ................ G06F 3/0635 |
| | | | 711/206 |
| 2015/0186442 A1* | 7/2015 | Wildermuth | ........ G06F 16/2228 |
| | | | 707/696 |
| 2015/0317340 A1* | 11/2015 | Sardina | .................. G06F 16/22 |
| | | | 707/803 |
| 2018/0218023 A1 | 8/2018 | Fanghaenel et al. | |
| 2019/0163613 A1 | 5/2019 | Martin et al. | |
| 2020/0097205 A1 | 3/2020 | Fanghaenel et al. | |
| 2020/0097558 A1 | 3/2020 | Fanghaenel | |
| 2020/0097573 A1 | 3/2020 | Fanghaenel et al. | |
| 2020/0097581 A1 | 3/2020 | Chong et al. | |
| 2020/0097583 A1 | 3/2020 | Fanghaenel | |
| 2020/0201745 A1 | 6/2020 | Martin et al. | |
| 2020/0250325 A1 | 8/2020 | Chong et al. | |
| 2020/0341864 A1 | 10/2020 | Agrawal et al. | |
| 2020/0409915 A1 | 12/2020 | Agrawal et al. | |

FOREIGN PATENT DOCUMENTS

| | | |
|---|---|---|
| AU | 2017356901 B2 | 12/2020 |
| AU | 2018290745 B2 | 12/2020 |
| AU | 2020102616 A4 | 12/2020 |
| DE | 248428 A1 | 8/1987 |
| DE | 249326 A1 | 9/1987 |
| DE | 252030 A1 | 12/1987 |
| DE | 254063 A1 | 2/1988 |
| DE | 273751 A3 | 11/1989 |
| DE | 274018 A1 | 12/1989 |
| DE | 274019 A1 | 12/1989 |
| DE | 252028 B5 | 4/1994 |
| DE | 252029 B5 | 4/1994 |
| IN | 2013MU01211 A | 12/1989 |

OTHER PUBLICATIONS

Reorganize and rebuild indexes—SQL Server, Microsoft Docs, Aug. 20, 2019, https://docs.microsoft.com/en-us/sql/relational-databases/indexes/reorganize-and-rebuild-indexes?view=sql-server-2017, 16 pages. [Retrieved Sep. 23, 2019].

* cited by examiner

DATABASE INDEX REPAIR

BACKGROUND

Technical Field

This disclosure relates generally to database systems, and, more specifically, to database indexes used to locate information in a database system.

Description of the Related Art

Database indexes may allow for efficient retrieval of data from a database table. Maintaining indexes, however, uses additional write commands and storage space. Periodically, a database index may become inconsistent with its underlying database table as database records are added or removed from the table but the index is not similarly updated, which may cause degradation in query performance for the index. Accordingly, a database system may need to repair the index to prevent such degradation. While the system is repairing an index, however, it prevents other processes from accessing the index.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing system configured to repair a database index" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As mentioned above, in various situations, indexes may become inconsistent with the underlying database table upon which they are built and, therefore, may need to be repaired in order to avoid degradation for various index searches. Traditional index repair, however, prevents concurrent access to both the index and the data table in order to prevent other processes from interfering with the repair process by potentially modifying entries being used by the repair process. The inability of the other processes to use the data table or the index during the repair causes degradation as these processes may be forced to idly wait until the repair process completes. This performance hit can be particularly significant in systems that, for example, have large data sets and handle high-volumes of database transactions concurrently.

The present disclosure describes embodiments in which a computing system may repair a database index while allowing the index or data table to be concurrently accessed by processes other than the repair process handling the repair. As will be described below in various embodiments, such an index repair may be performed using multiple locks having varied restrictions and varied scopes. For example, in some embodiments, the repair process acquires a less restrictive lock on a set of database records that restricts structural modifications but allows concurrent access and acquires a more restrictive lock on single database records determined to be relevant to correcting a particular identified inconsistency. Performing a repair process using these types of locks may, as mentioned, advantageously allow application processes to concurrently access the database index or database table while the repair is ongoing. Thus, any processes that would have traditionally blocked awaiting access to the database table or the index can proceed forward, avoiding the prior degradation in performance.

Example Index Repair

Figure 1:
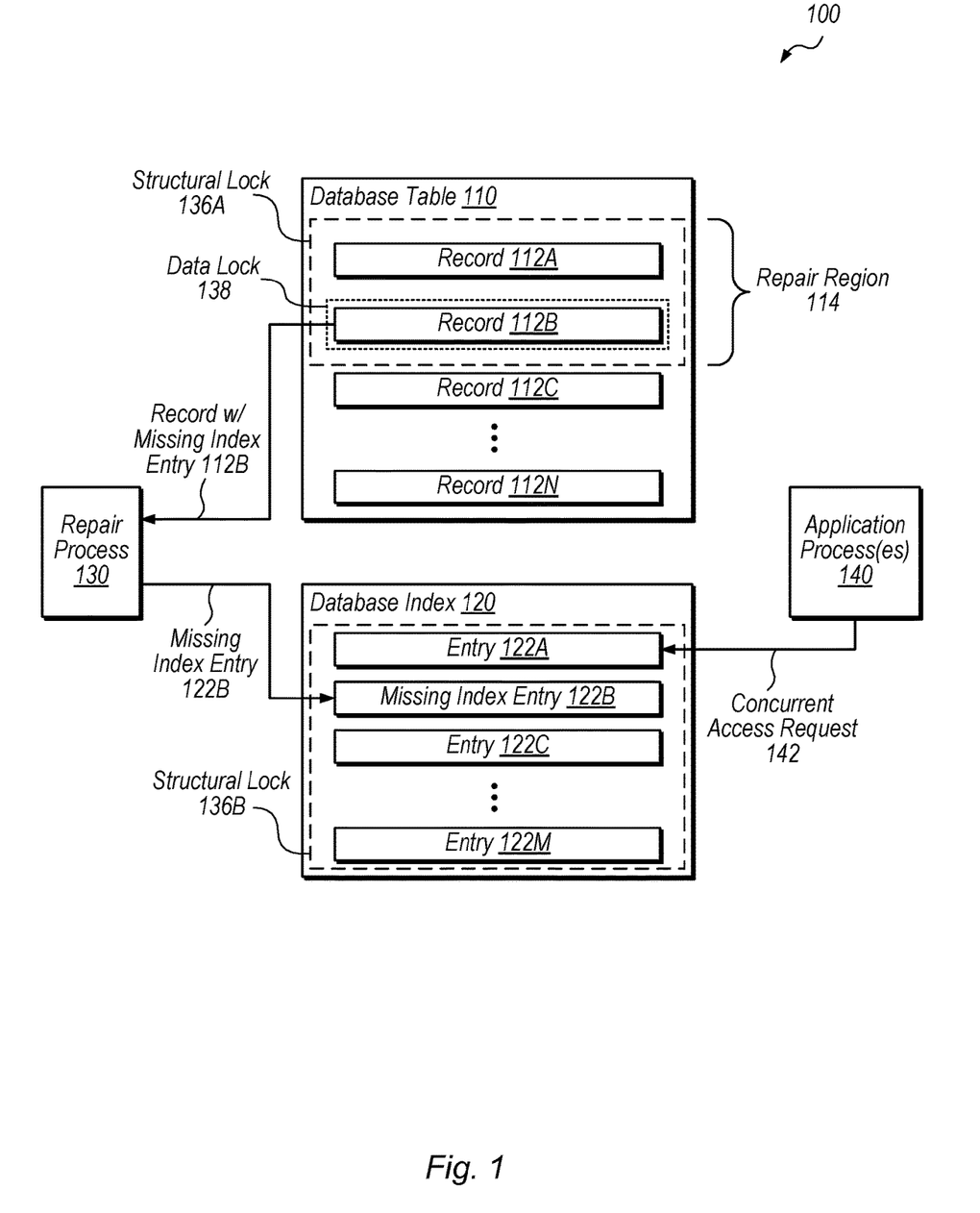
FIG. 1 is a block diagram illustrating a computing system configured to perform a repair operation for an index while allowing access to the index concurrently with the repair operation, according to some embodiments.

FIG. 1 is a block diagram illustrating a computing system 100 configured to repair an index while allowing access to the index concurrently with the repair, according to some embodiments. In the illustrated embodiment, computing system 100 includes a database table 110, a database index 120 for table 110, a repair process 130 for repairing index 120, and one or more application process(es) 140 executable to access index 120 to locate content of table 110.

Database table 110, in the illustrated embodiment, is a data structure that includes records 112A-112N, which may include various data maintained by system 100. In some embodiments, database table 110 is a relational database; however, database table 110 may employ any suitable database scheme. In some embodiments, database table 110 is included in a multi-tenant database system and, therefore, may include records 112 for different tenants. As used herein, the term "multi-tenant database system" refers to those systems in which various elements of hardware and software of the database system are shared by multiple customers. As shown, database table 110 may store data for one or more application processes 140 in records 112. As used herein, the term "process" refers to an instance of a computer program/program instructions being executed by a computing system 100. In some embodiments, one or more of application processes 140 may use a database index 120 to quickly locate their data within database table 110.

Database index 120, in the illustrated example, is a data structure used to locate records 112 of database table 110. Database index 120 includes entries 122A-122M for corresponding database records 112A-112N in database table 110. In some embodiments, index entries 122 include index key values that match values for fields of corresponding database records 112. In some embodiments, one of application processes 140 locates database records 112 by comparing a key value (associated with a given field of database table 110) to the index 120. Based on finding a match for the key value in the index 120, the application process 140 may retrieve data stored in the identified record from the database table 110.

In some embodiments, multiple types of indexes may be maintained for a database table, which may be generally classified as primary or secondary indexes. In some embodiments, computing system 100 generates a database index 120 based on a non-primary key/secondary key of record 112 that corresponds to a field (column) of the database table 110 for which quick lookup is desired—thus index 120 may be classified as a secondary index. In some embodiments, computing system 100 generates database index 120 for a multi-tenant database table. In such situations, database index 120 may include entries for records of multiple different tenants. An example multi-tenant index is discussed in detail below with reference to FIG. 8.

Repair process 130, in the illustrated example, is an instance of a computer program that is executable by computing system 100 to repair database index 120. For example, as shown, repair process 130 may read a particular record 112B, determine that the record 112B does not have a corresponding entry 122B, and insert a new index entry 122B into database index 120. In some embodiments, repair process 130 operates on a repair region 114 that includes only a subset of the records 112 during a given repair as shown in FIG. 1. A repair region 114, as shown in the illustrated example, includes a region of database table 110 for which an index may be repaired. For example, repair process 130 may evaluate index entries for records 112A and 112B for a given repair and evaluate an index entry for record 112C during another repair. In other embodiments, repair region 114 includes all records 112 in database table 110, rather than a portion of the records included in the table. As discussed in detail below with reference to FIGS. 2 and 3, repair process 130 may perform a repair in two phases, which may be performed in any order. In a first phase of repair, process 130 may perform a scan of database table 110 to identify one or more database records 112 with missing index entries in database index 120. In a second phase of repair, process 130 may perform a scan of database index 120 to determine one or more incorrect index entries 122, which may be pointing at removed records 112 or the wrong records 112.

To prevent other processes (such as an application process 140) from interfering with the repair, in the illustrated embodiment, repair process 130 begins by placing a structural lock 136A on the portion of database table 110 corresponding to repair region 114—e.g., records 112A and 112B in the example shown in FIG. 1. As used herein, the term "structural lock" refers to a type of lock that prevents structural modifications to a data structure by other processes but can allow other process to modify the data in the data structure. Accordingly, a structural lock may prevent Database Definition Language (DDL) operations (e.g., create, alter, drop, etc.) by other processes on a database table but may allow Database Manipulation Language (DML) operations (e.g., select, insert, update, delete, merge, etc.) by other processes on content of records included in the database table. In the illustrated example, repair process 130 also places a structural lock 136B on the entries in the database index 120 that correspond to the records 112 in repair region 114. (In other embodiments, structural locks 136A and 136B may have a scope covering the entireties of database table 110 and database index 120). In acquiring locks 136, repair process 130 may prevent, for example, another process from adding (or removing) a field, which could result in the repair malfunctioning.

After placing respective structural locks 136, repair process 130 may identify that, for example, database table 110 includes a record 112B with a missing index entry and places a data lock 138 on the unindexed record 112B. As used herein, the term "data lock" refers to a type of lock that prevents modifications to the data/content of database records by other processes. In the illustrated example, repair process 130 generates the missing index entry 122B based on record 112B and adds it in database index 120. In some embodiments, repair process 130 performs periodic repairs (e.g., nightly, weekly, monthly) for one or more database indexes 120.

As mentioned above, the usage of structural locks 136 and data locks 138 may allow processes other than repair process 130 to access records 112 and index entries 122 during a repair. For example, as shown, an application 140 may perform a concurrent access 142 of an index entry 122A during a repair in order to look up some corresponding record in database table 110. While structural locks 136 may prevent applications 140 from modifying the structures of table 110 and index 120 and data locks 138 may bar modification of individual records 112 and entries 122, the overall impact of the repair can be greatly reduced. Furthermore, attempting to repair regions 114 on only portions of table 110 and index 120 may mitigate the overall impact. For example, in embodiments implementing a multi-tenant database scheme, a repair may be performed for a given tenant's data in order to reduce the impact on other tenants.

Example Scanning

Figure 2:
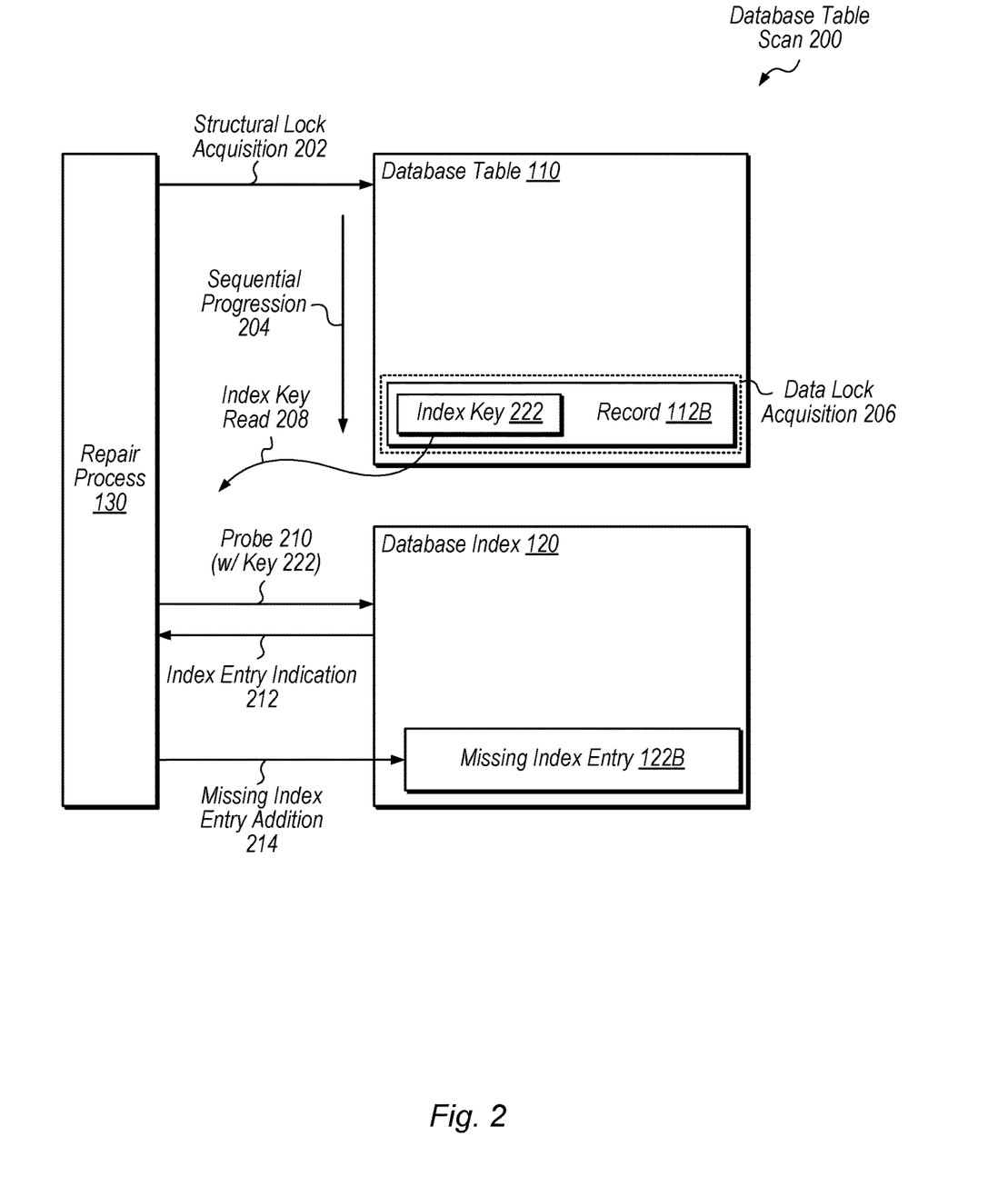
FIG. 2 is a block diagram illustrating an example database table scan performed during the repair operation, according to some embodiments.

FIG. 2 is a block diagram illustrating an example sequential scan 200 of database table 110 during repair of a database index 120, according to some embodiments. In the illustrated embodiment, repair process 130 performs various repair steps 202-214 to add a missing index entry 122B to database index 120. In other embodiments, repair process 130 may implement steps 202-214 in a different order or perform different steps. For example, although described as a sequential scan 200, other suitable scanning techniques may be employed.

Repair process 130, in the illustrated embodiment, begins with an acquisition 202 of a structural lock 136A on a repair region 114 that includes record 112B, of database table 110, to prevent structural modifications to that record during repair of database index 120. In some embodiments, repair process 130 also acquires a structural lock 136B on database index 120. After successfully acquiring locks 136, repair process 130 scans one or more records 112 of database table 110 in a sequential progression 204. As repair process 130 progresses forward, it may perform an acquisition 206 for a data lock 138 on a record 112 and then perform a read 208 of an index key 222 from the record 112. In some embodiments, index key 222 is the value of a field included in record 112B for which indexing is desired. After obtaining scanned record 112, repair process 130 performs a probe 210, with index key 222, of database index 120.

In the illustrated example, repair process 130 receives an index entry indication 212 based on probe 210. In some embodiments, if no corresponding entry 122 exists in database index 120 for the probed index key 222, indication 212 may merely indicate the lack of an entry 122 such as will be discussed below with FIG. 4. In some embodiments, if the index key 222 for record 112B matches the index key value of entry 122B in database index 120, indication 212 may include the corresponding entry 122 with the matching index entry 122, so that repair process 130 can confirm that it does not reference the wrong record 112. Based on the index entry indication 212, repair process 130 generates missing index entry 122B for database record 112B and performs an addition 214 of it to database index 120. In some embodiments, steps 206-214 are repeated for subsequently scanned database records.

In some embodiments, repair process 130 omits record 112B from repair, even though it has a missing entry in database index 120. For example, as will be discussed below with reference to FIG. 7, if repair process 130 is unable to acquire data lock 138 on record 112B, the process may skip over this record and continue to the next record within database table 110. For example, if an application process 140 is modifying record 112B when repair process 130 requests acquisition, the requested acquisition may fail.

Figure 3:
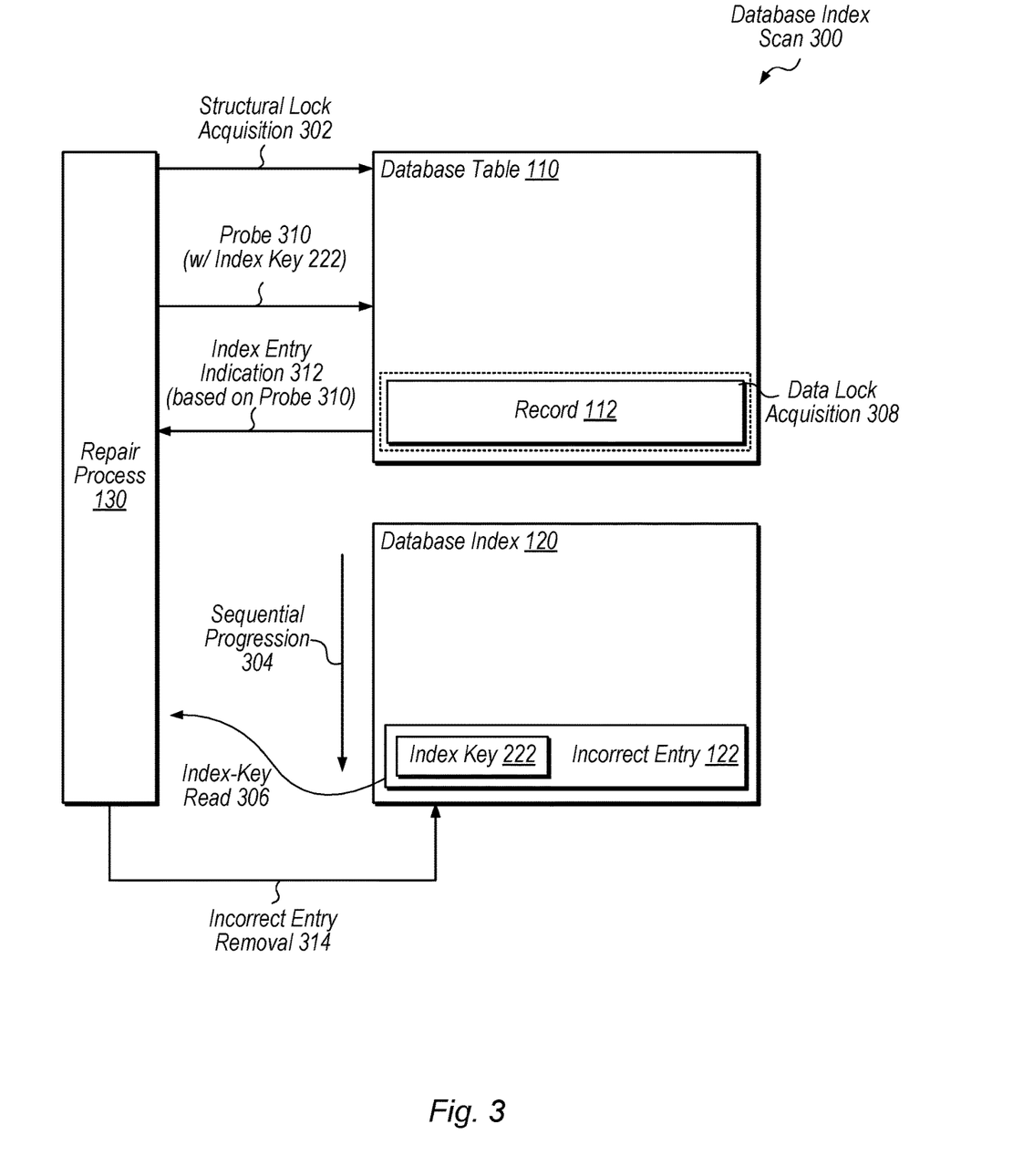
FIG. 3 is a block diagram illustrating an example database index scan performed during the repair operation, according to some embodiments.

FIG. 3 is a block diagram illustrating an example sequential scan 300 of a database index 120 during repair of the database index 120, according to some embodiments. In the illustrated example, repair process 130 performs various repair steps 302-314 during a second phase of index repair. In other embodiments, repair process 130 may implement steps 302-314 in a different order or perform different steps. For example, although described as a sequential scan 300, other suitable scanning techniques may be employed.

In the illustrated embodiment, repair process 130 begins with an acquisition 302 of a structural lock 136A on one or more records 112 of database table 110 to prevent structural modifications to those records during repair of database index 120. In some embodiments, repair process 130 also acquires a structural lock 136B on database index 120. Repair process 130 then performs a scan in sequential progression 304 of database index 120. In the illustrated example, this scanning includes performing a read 306 of an index key 222 in an index entry 122. Based on the index key 222 of the scanned entry 122, repair process 130 performs an acquisition 308 of a data lock 138 on the corresponding database record 112. In some embodiments, acquisition of data lock 138 is unsuccessful and computing system 100 performs a recovery operation as described in detail below with reference to FIG. 7.

In the illustrated embodiment, after acquiring lock 138, repair process 130 performs a probe 310 of database table 110. Repair process 130, in the illustrated example, receives index entry indication 312 based on probe 310. Finally, repair process 130 performs a removal 314 of incorrect entry 122 from database index 120 after receiving index entry indication 312. In some embodiments, steps 306-314 are repeated for subsequently scanned database index entries. In situations where multiple incorrect entries are returned based on database index scan 300, computing system 100 may become overloaded due to the large amount of memory tied up. Therefore, computing system 100 may separate repair process 130 into multiple different transactions as discussed in detail below with reference to FIG. 6. Examples of possible inconsistencies between database records 112 and database index entries 122 will now be discussed with respect to FIGS. 4 and 5.

Examples of Index Inconsistencies

Figure 4:
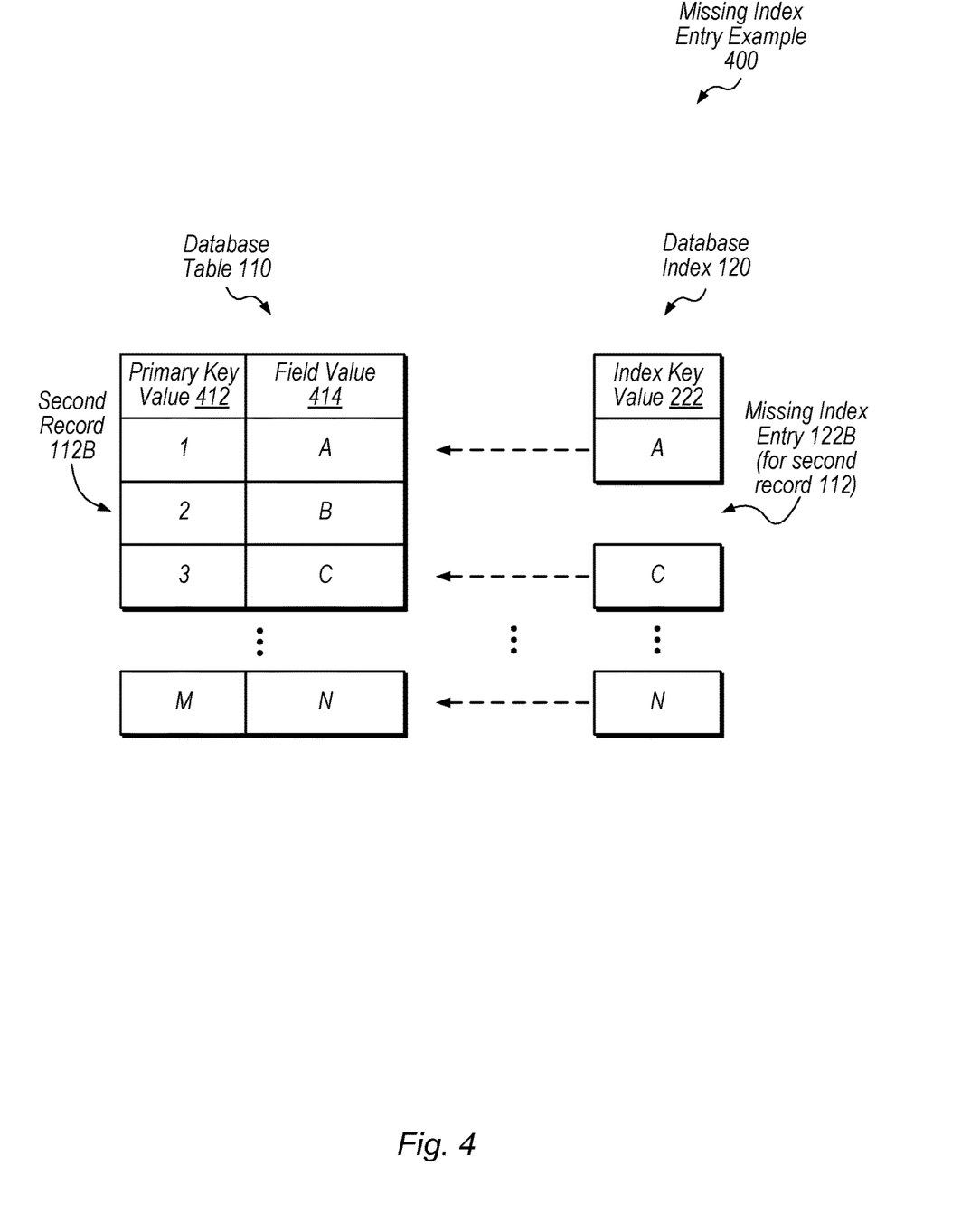
FIG. 4 is a block diagram illustrating an example database index with a missing index entry, according to some embodiments.

FIG. 4 is a block diagram illustrating an example 400 of database index 120 with a missing index entry 122, according to some embodiments. In the illustrated embodiment, database table 110 includes records with primary key values 412 and field values 414, while database index 120 includes index key values 222 for corresponding database records. Database index 120, in the illustrated example, includes index key values 222 for corresponding records of database table 110 except for second record 112B, which is missing an index entry 122 within index 120. In the illustrated example, index key values 222 of index entries point to rows of database table 110 (e.g., by referencing the primary key 412 of the records 112 in an additional field not depicted in FIG. 4).

As shown in example 400, index key value "A" points to the first row of database table 110 where the row has a matching field value 414 of "A." Similarly, in the illustrated example, index key value "C" points to the third row of database table 110, which has a matching field value 414 of "C." In some embodiments, repair process 130 may identify that database index 120 omits an entry 122B for a database record 112B. Such an omission may have occurred, for example, when an application process 140 added a record 112B to database table 110, but no corresponding index entry 122B was added to database index 120. In this case, repair process 130 may attempt to insert the omitted entry 122B into index 120.

Figure 5:
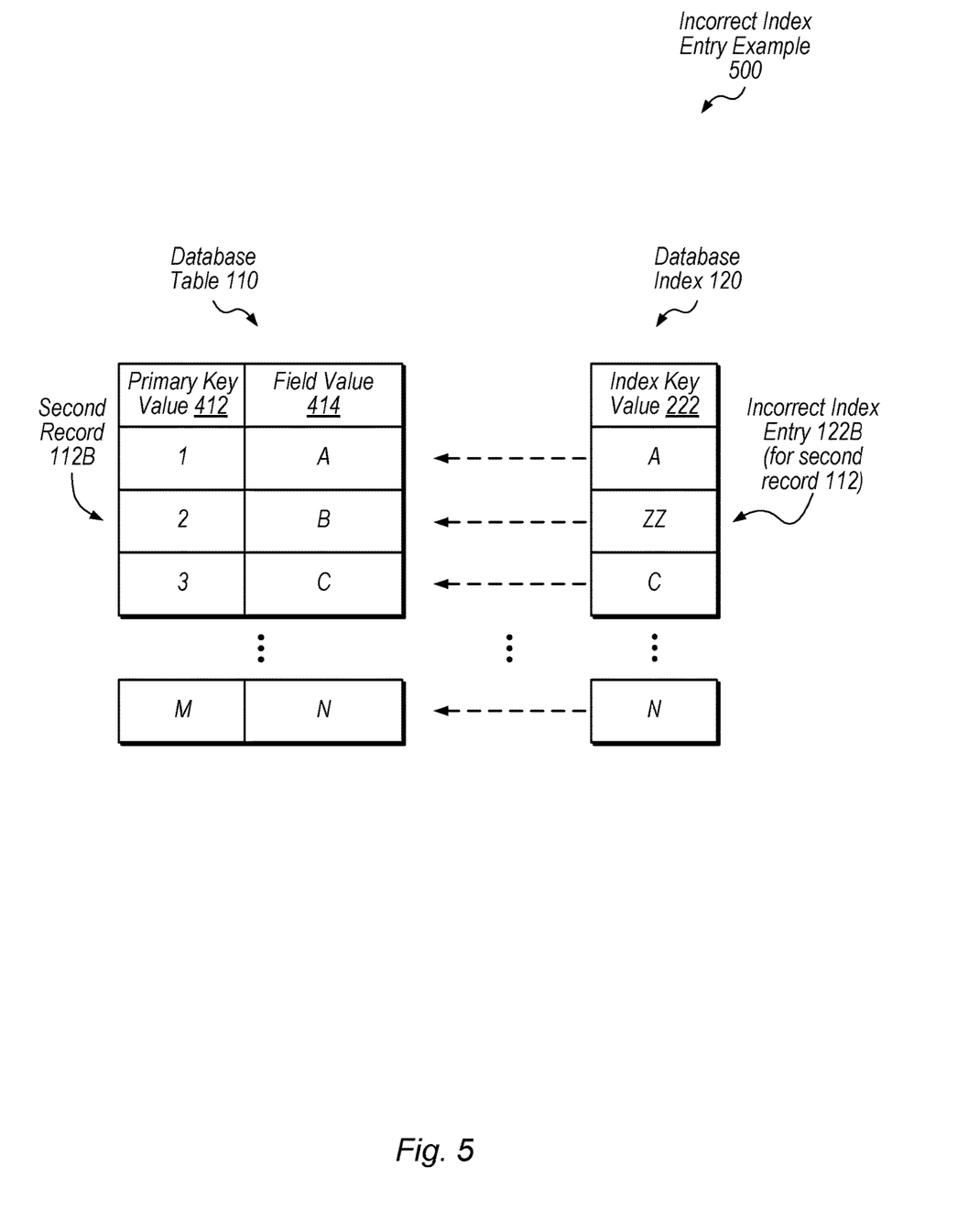
FIG. 5 is a block diagram illustrating an example database index with an incorrect index entry, according to some embodiments.

FIG. 5 is a block diagram illustrating another example 500 of database index 120 with an incorrect index entry 122B, according to some embodiments. As shown, entry 122B may have the index key value 222 of "ZZ" and point at record 112B. The second index entry 122B, however, is incorrect because the index key value 222 no longer matches the correct field value 414 of "B" for second record 112B. Such an inconsistency may occur, for example, when the field value 414 is updated without also updating the index key value 222 in database index 120. Therefore, repair process 130 may repair database index 120 to mitigate this error by updating index key value 222 to "B"—or removing index entry 122B if another entry 122 currently exists for record 112B.

Example Repair Process Transactions

Figure 6:
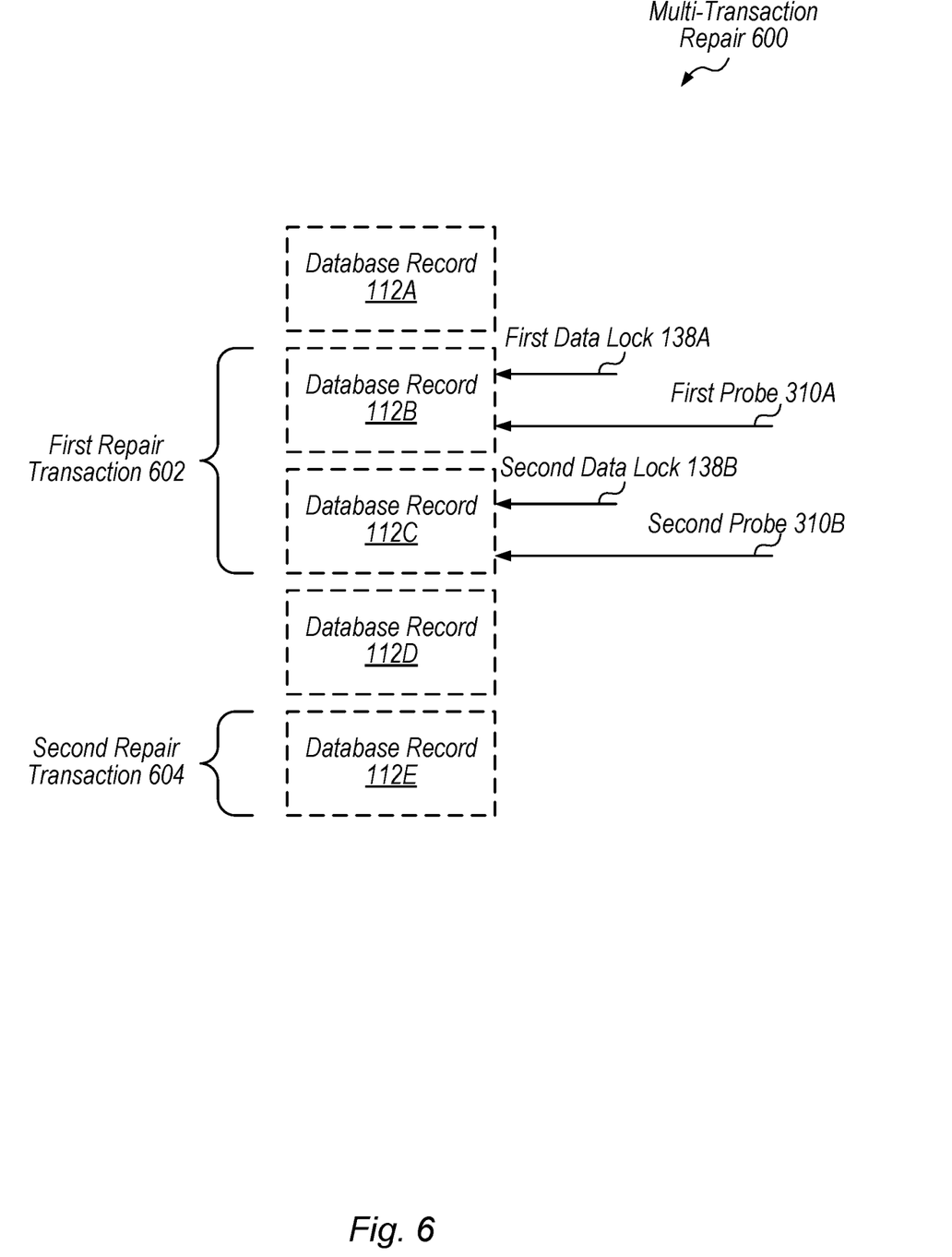
FIG. 6 is a diagram illustrating example transactions for the repair operation, according to some embodiments.

FIG. 6 is a diagram illustrating example transactions for a database index repair process, according to some embodiments. In some embodiments, repair process 130 performs a single transaction to repair all incorrect index entries in database index 120. In other embodiments, repair process 130 performs multiple transactions that each include repairing a portion of the incorrect index entries in the index. Performing multiple transactions may allow database records or index entries, that otherwise would be locked during performance of a single transaction for the database index, to be concurrently accessed during the repair—thus, reducing the amount of resources (e.g., records, index entries) that are unavailable during repair of a database index. Multi-transaction repair 600 illustrates two different transactions 602 and 604 that may be included in a repair process 130.

In the illustrated example, a repair process 130 acquires locks on one or more of database records 112A-112E included in a database table 110 in order to repair corresponding entries of database index 120. In a first repair transaction 602, a process 130 repairs index entries for database records 112B and 112C. In the illustrated example, after scanning database table 110 to identify records 112B and 112C for a first repair transaction, repair process 130 acquires a first data lock 138A on database record 112B. Next, repair process 130 performs a first probe 306A of database table 110 based on acquiring lock 138A on record 112B. In some embodiments, based on results of the first probe 306A, repair process 130 may tombstone or remove an index entry for database record 112B.

In the illustrated example, repair process 130 places a second data lock 138B on database record 112C and then performs a second probe 310B on database table 110. Based on results of the second probe 310B, repair process 130 may tombstone or remove an index entry corresponding to database record 112C. Finally, after completing first repair transaction 602 and before beginning second repair transaction 604, repair process 130 may release data locks 138A and 138B.

In some embodiments, after removing an index entry for database record 112B and before removing an index entry for database record 112C, repair process 130 releases first data lock 138A. In the illustrated example, repair process 130 performs a second repair transaction 604. Second repair transaction 604, in the illustrated example, includes only database record 112E. In some embodiments, transactions 602 and 604 are included in the same repair process 130. At the end of repair process 130 (which may include a plurality of transactions), all data locks 138 acquired during transactions 602 and 604 may be released. Note that index entries awaiting repair in process 130 may be split up into a plurality of different transactions.

Example Index Snapshots

Figure 7:
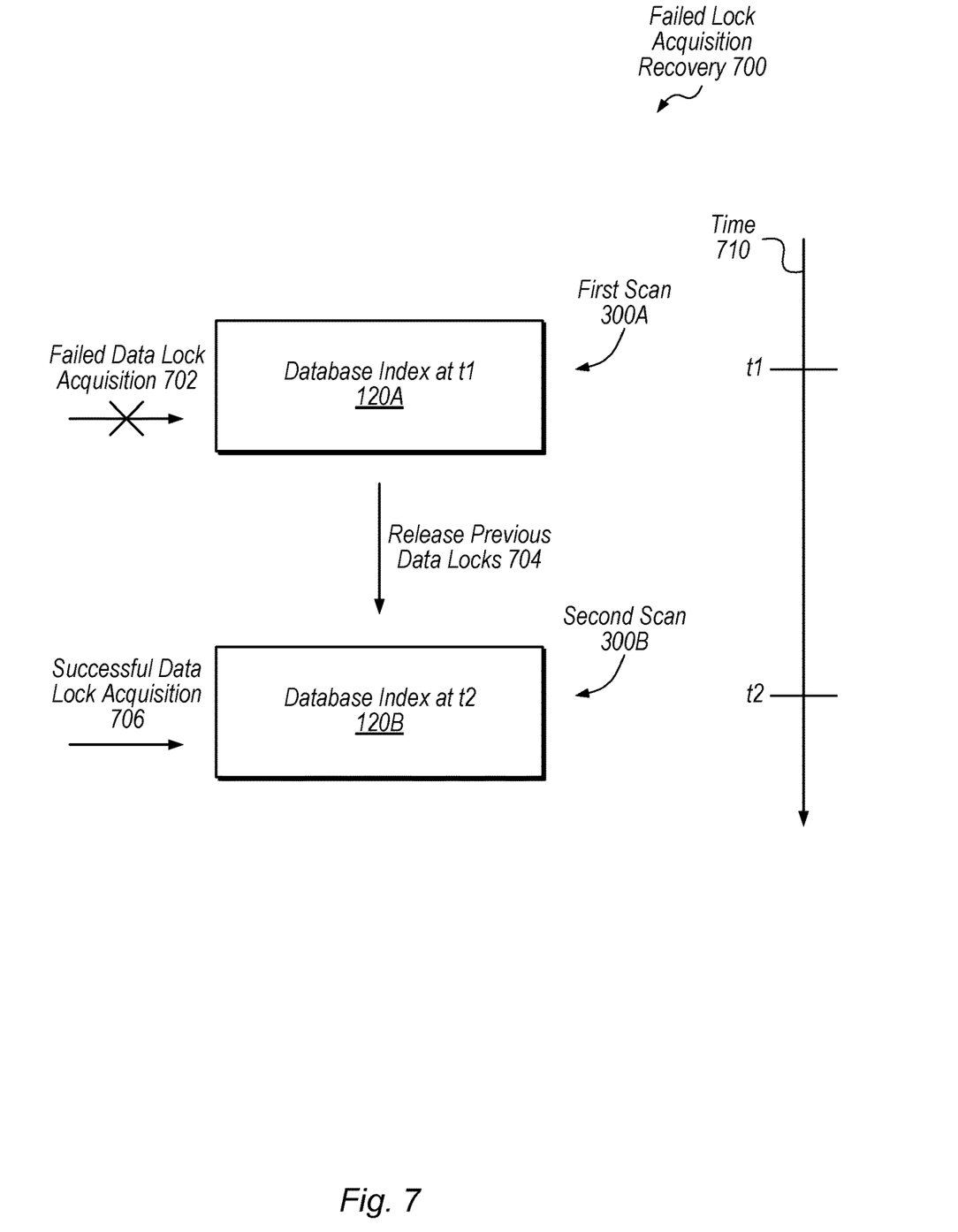
FIG. 7 is a block diagram illustrating an example of a recovery from a failed lock acquisition during the repair operation, according to some embodiments.

FIG. 7 is a block diagram illustrating an example 700 of a recovery from a failed lock acquisition during a repair operation performed on database index 120, according to some embodiments. Example 700 displays snapshots of a database index 120 (shown as 120A and 120B) at two different points in time 710.

In the illustrated example, repair process 130 performs a first scan 300A of database index 120 at t1, which corresponds to a first snapshot of index 120. At 702, in the illustrated example, repair process 130 attempts to acquire a data lock 138 on a database record that corresponds to an index entry 122 included in snapshot 120A of the database index 120. In the illustrated example, however, repair process 130 fails to acquire the data lock—this failed acquisition may be described as a snapshot violation in some embodiments. Rather than block awaiting release of this lock, repair process 130 proceeds forward until completion and, at 704, releases previously-acquired data locks 138. Note that this may allow other processes to access database records corresponding to the released data locks instead of these processes waiting for repair process 130 to unblock. The data locks released at 704 may have been previously acquired on various database records corresponding to entries included in index snapshot 120A.

When repair process 130 later attempts a subsequent repair, the process performs a second scan 300B of the database index at t2, which corresponds to a second snapshot of index 120. In this example, at 706, repair process 130 successfully acquires a data lock 138 on a database record 112 that corresponds to an entry 122 included in snapshot 120B of the database index and is able to finally correct the inconsistency for the entry associated with the failed lock acquisition. In some embodiments, repair process 130 begins second scan 300B at a location corresponding to the database record upon which acquisition of data lock 138 failed.

In some embodiments, repair process 130 stores one or more updated index entries for database index 120 in a data structure. In some embodiments, the data structure stores one or more changes awaiting commitment. For example, the data structure may store newly generated index entries before the entries are committed to the database index. In various situations, this data structure may be a write buffer that accumulates data in memory before committing the data, for example. In some embodiments, this data structure may correspond to an initial stage of a log-structured merge (LSM) tree.

Example Multi-Tenant Index

Figure 8:
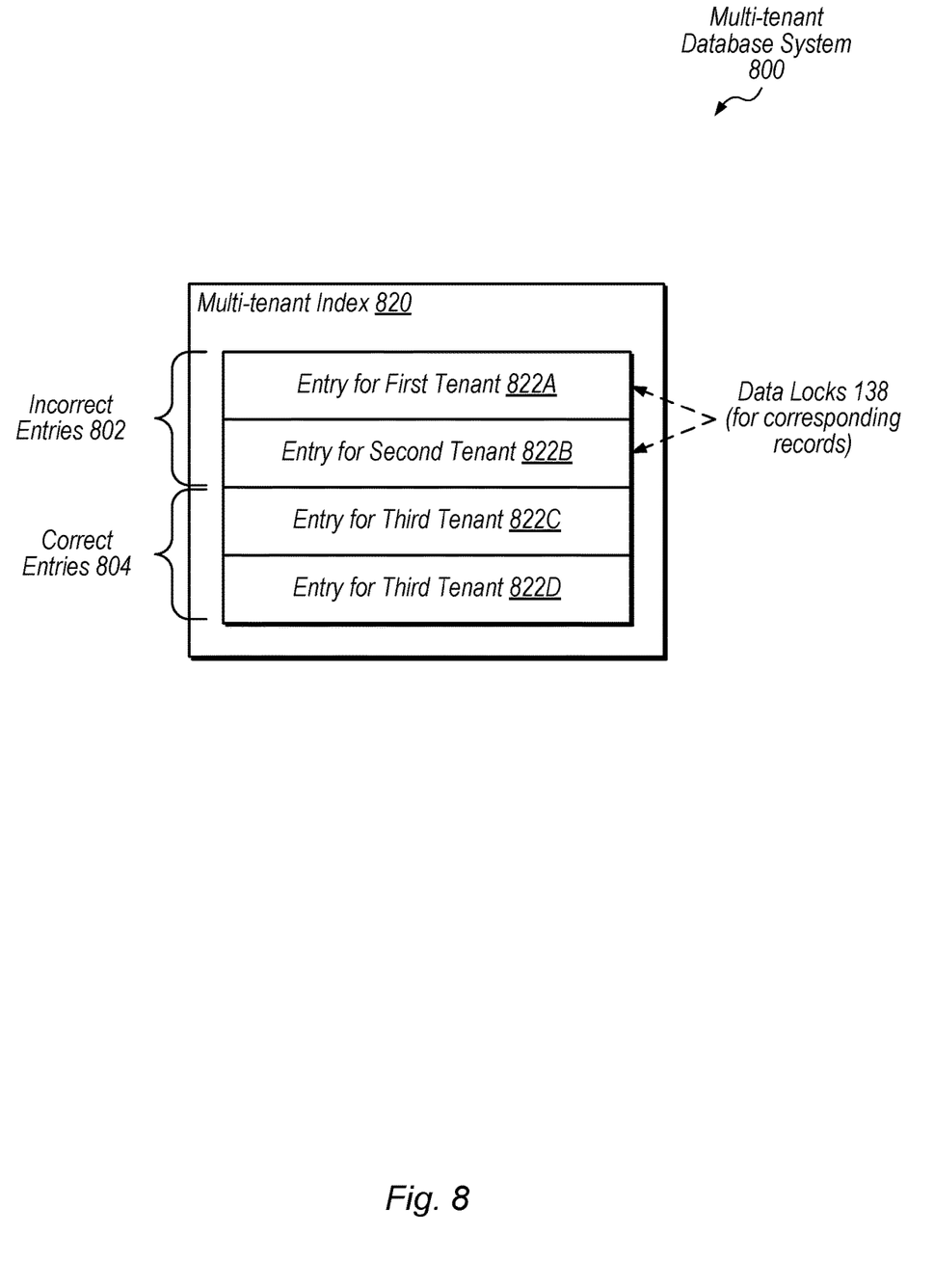
FIG. 8 is a block diagram illustrating an example multi-tenant database system that includes a multi-tenant index with incorrect entries for one or more tenants, according to some embodiments.

FIG. 8 is a block diagram illustrating an example multi-tenant database system 800 that includes a multi-tenant index with incorrect entries for one or more tenants, according to some embodiments. Multi-tenant database system 800, in the illustrated embodiment, includes a multi-tenant index 820 with entries 822A-822D for database records associated with different tenants.

In some embodiments, a computing system that includes multi-tenant index 820 processes requests for a great number of customers, and a database table may store rows for a potentially greater number of customers. In various embodiments, data for different tenants may be securely stored such that other tenants cannot access the data absent permission. For example, a first application process 140 associated with a first tenant may not access data within database table 110 for a second tenant and vice versa.

In the illustrated embodiment, multi-tenant index 820 includes two incorrect entries 802 and two correct entries 804. In some embodiments, repair process 130 identifies the two incorrect entries 802 within multi-tenant index 820. Specifically, repair process 130 may identify that entry 822A for a first tenant and entry 822B for a second tenant need repair. Repair process 130 places data locks 138 on respective database records corresponding to the identified incorrect entries 802. In the illustrated embodiment, correct entries 804 for a third tenant, 822C and 822D, are not repaired by repair process 130 and, therefore, repair process 130 does not hold a data lock 138 for database records corresponding to these entries. Accordingly, one or more application processes 140 may modify content of database records corresponding to entries 822C and 822D for the third tenant during the repair of index 820. In addition, one or more application process 140 may use index 820 to locate records corresponding to entries 822C and 822D during the repair. The following is one example command that initiates repair process 130 for one or more entries in multi-tenant index 820 corresponding to the first tenant:

REPAIR INDEX multi-tenant index [FOR TENANT first tenant]

In some embodiments, repairing index entries for one or more tenants only may advantageously decrease the number of index entries for repair relative to traditional techniques. For example, an index includes 1 million entries for multiple different tenants and repair process 130 repairs entries for only one the different tenants. In this example, the one tenant is associated with 300 entries. Accordingly, in this example, only 300 of the 1 million entries will be unavailable to other processes (e.g., application process(es) 140) during all or a portion of the repair.

Example Method

Figure 9:
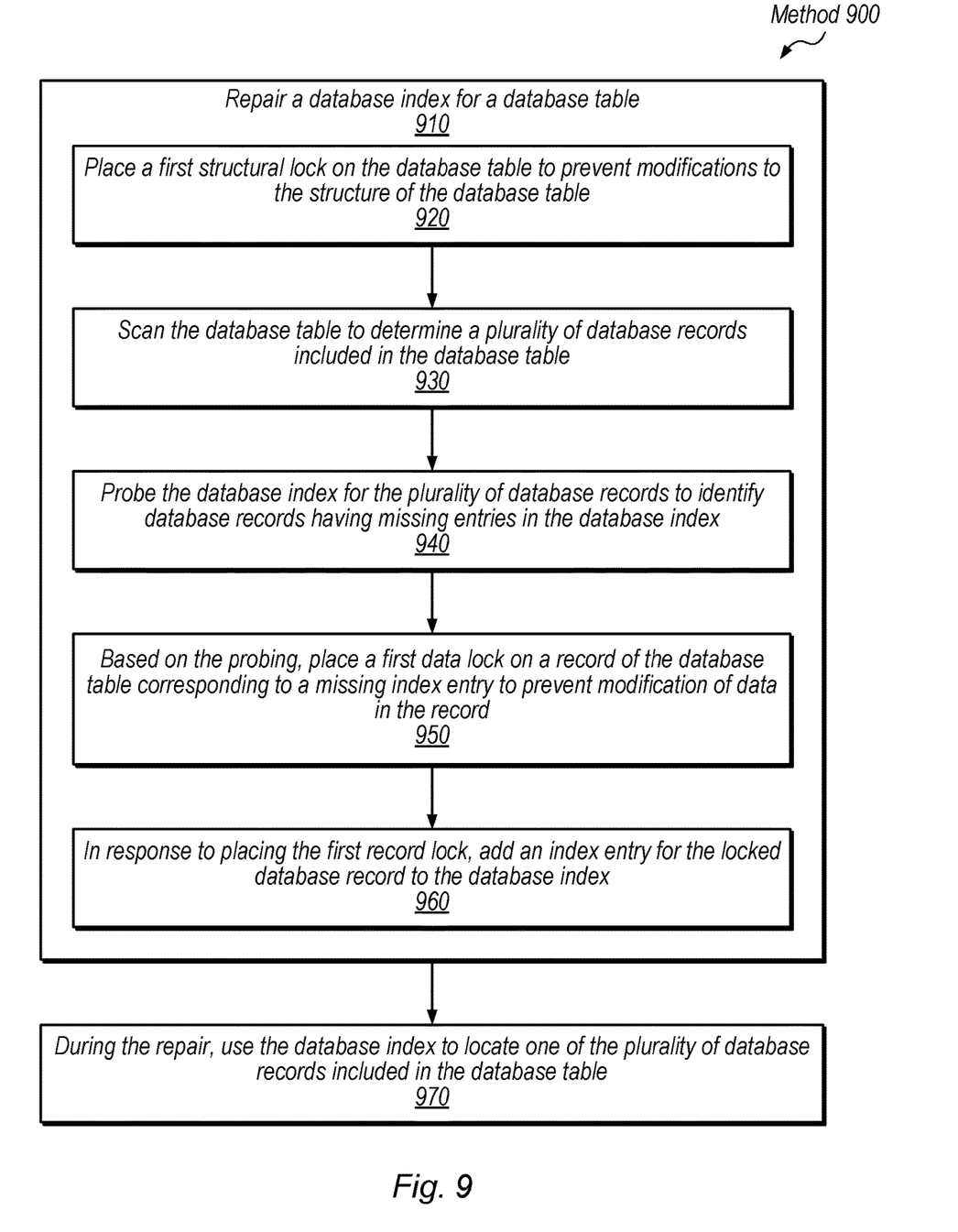
FIG. 9 is a flow diagram illustrating a method for repairing a database index using both a structural lock and a data lock, according to some embodiments.

Turning now to FIG. 9, a flow diagram illustrating a method 900 for repairing a database index, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a computing system repairs a database index for a database table. In some embodiments, the database table includes records for a plurality of tenants. In some embodiments, the computing system repairs index entries for database records of one or more of the plurality of tenants.

At 920, the computing system places a first structural lock on the database table to prevent modifications to the structure of the database table. In some embodiments, the system acquires a first structural lock on the database table.

At 930, the computing system scans the database table to determine a plurality of database records included in the database table. In some embodiments, the computing system scans a primary database index for the database table to identify one or more duplicate keys. In some embodiments, the computing system outputs a report that specifies one or more identified duplicate keys. In some embodiments, the database index for the database table is a secondary index.

At 940, the computing system probes the database index for the plurality of database records to identify database records having missing entries in the database index.

At 950, based on the probing, the computing system places a first data lock on a record of the database table corresponding to a missing index entry to prevent modification of data in the record. In some embodiments, in response to placement of a data lock failing, the computing system omits, from consideration during the repairing, a record of the database table corresponding to an identified missing index entry. In some embodiments, the computing system acquires a first data lock on a record of the database table.

At 960, in response to placing the first record lock, the computing system adds an index entry for the locked database record to the database index. In some embodiments, the computing system places a second structural lock on the database index to prevent modifications to the structure of the database index. In some embodiments, the computing system scans the database index to determine a plurality of index entries. In some embodiments, the computing system places data locks on respective database records corresponding to the determined plurality of index entries. In some embodiments, in response to placing the data locks on respective database records, the computing system probes the database table for the plurality of index entries to identify incorrect index entries. In some embodiments, based on identifying an incorrect index entry, the computing system removes the incorrect entry from the database index. In some embodiments, during repair of the database index, one or more application processes modify one or more records of the database table.

In some embodiments, in response to placement of a data lock failing, the computing system releases one or more previously-placed data locks. In some embodiments, the computing system performs another scan of the database index at a location corresponding to the record associated with the failed data lock placement. In some embodiments, prior to adding an index entry for the locked database record to the database index, the computing system stores a generated index entry in a data structure for storing transactions awaiting commitment, where the adding the index entry includes sending the generated index entry from the data structure to the database index. In some embodiments, the computing system releases the first record lock on the record of the database table based on adding an index entry to the database for the record.

At 970, during the repair, one or more application processes used the database index to locate one of the plurality of database records included in the database table. In some embodiments, the computing system performs a first transaction that includes repairing one or more index entries. In some embodiments, after completing the first transaction and before beginning a second transaction, the computing system releases one or more data locks on respective database records corresponding to the one or more index entries.

Repairing an index by placing locks on only errored index entries may reduce the amount of both storage space and processing time used in repairing an index. In addition, repairing errored index entries only may be performed without sorting operation. In some embodiments, indexes with immutable, sorted index records may advantageously reduce or remove the need for sorting before repairing an index. Repairing an index without sorting may advantageously reduce processing time during repair.

Example Computing Device

Figure 10:
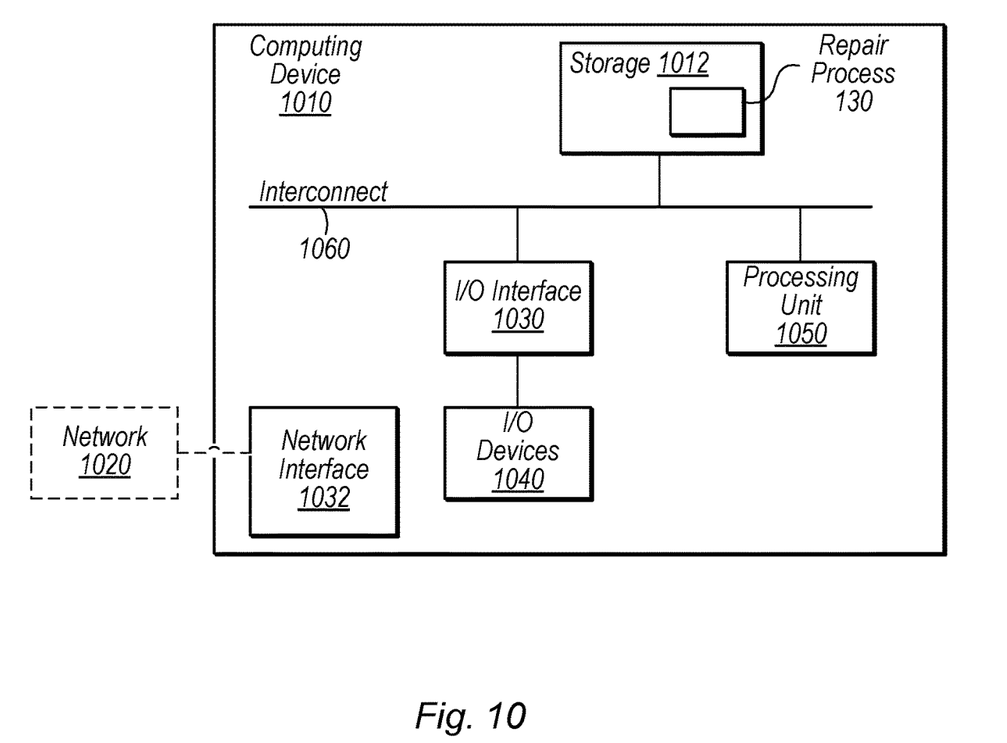
FIG. 10 is a block diagram illustrating an example computing device, according to some embodiments.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computer system, a client computer system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

Processing unit 1050 includes one or more processors and, in some embodiments, includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 1012 is usable by processing unit 1050 (e.g., to store instructions executable by and data used by processing unit 1050). In addition, storage subsystem 1012 may include one or more repair processes 130 usable by processing unit 1050. In some embodiments, storage 1012 may include one or more other processes, such as one or more of application processes 140. Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 10 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
performing, by a computing system, a repair process on a database index for a database table, wherein the database index and the database table are data structures maintained by the computing system, and wherein performing the repair process includes:
placing a first structural lock on the database table, wherein the first structural lock prevents other processes from modifying the structure of the database table;
scanning the database table to determine a plurality of database records included in the database table;
probing the database index for the plurality of database records to identify database records existing in the database table that are missing corresponding entries in the database index;
based on the probing, placing a first data lock that is different from the first structural lock on an identified record of the database table corresponding to a missing index entry, wherein the first data lock prevents other processes from modifying data in the record; and in response to placing the first data lock, adding an index entry for the locked database record to the database index; and during performance of the repair process, using the database index to locate one of the plurality of database records included in the database table.

2. The method of claim 1, wherein performing the repair process further includes:

placing a second structural lock on the database index to prevent modifications to the structure of the database index;

scanning the database index to determine a plurality of index entries;

placing data locks on respective database records corresponding to the determined plurality of index entries;

probing the database table for the plurality of index entries to identify incorrect index entries;

based on identifying an incorrect index entry, removing the incorrect entry from the database index; and during performance of the repair process, modifying one or more records of the database table.

3. The method of claim 2, further comprising:

in response to placement of a data lock failing, releasing one or more previously placed data locks; and performing another scan of the database index at a location corresponding to the record associated with the failed data lock placement.

4. The method of claim 1, further comprising:

in response to placement of a data lock failing, omitting, from consideration during performance of the repair process, a record of the database table corresponding to an identified missing index entry.

5. The method of claim 1, wherein performing the repair process includes:

performing a first transaction that includes repairing one or more index entries, wherein the repairing further includes:

after completing the first transaction and before beginning a second transaction, releasing one or more data locks on respective database records corresponding to the one or more index entries.

6. The method of claim 1, wherein the database table includes records for a plurality of tenants, and wherein the repairing the database index includes repairing index entries for database records of one or more of the plurality of tenants.

7. The method of claim 1, further comprising:

scanning a primary database index for the database table to identify one or more duplicate keys; and outputting, by the computing system, a report that specifies one or more identified duplicate keys, wherein the database index for the database table is a secondary index.

8. The method of claim 1, wherein performing the repair process further includes:

prior to adding an index entry for the locked database record to the database index, storing a generated index entry in a data structure for storing transactions awaiting commitment, wherein the adding the index entry includes sending the generated index entry from the data structure to the database index.

9. A non-transitory computer-readable medium having instructions stored thereon that are capable of execution by a computing device to perform operations comprising:

performing, a repair process on a database index for a database table, wherein the database index and the database table are data structures maintained by the computing device, and wherein performing the repair process includes:

acquiring first and second structural locks on respective ones of the database table and the database index, wherein the first and second structural locks prevent other processes from modifying the structure of the database table and the database index;

scanning the database index to determine a plurality of index entries;

acquiring data locks that are different from the first and second structural locks on respective database records corresponding to the determined plurality of index entries, wherein the data locks prevent other processes from modifying data in the respective database records;

in response to acquisition of a data lock failing, releasing one or more previously acquired data locks;

probing the database table for the plurality of index entries to identify incorrect index entries; and based on identifying an incorrect index entry, removing the incorrect entry from the database index; and during performance of the repair process, modifying one or more records of the database table.

10. The non-transitory computer-readable medium of claim 9, wherein the operations further comprise:

performing another scan of the database index at a location corresponding to the record associated with the failed data-lock acquisition.

11. The non-transitory computer-readable medium of claim 9, wherein the incorrect index entry is an index entry that is inconsistent with a corresponding record in the database table.

12. The non-transitory computer-readable medium of claim 9, wherein performing the repair process further includes:

scanning the database table to determine a plurality of database records included in the database table;

probing the database index for the plurality of database records to identify database records having missing entries in the database index;

based on the probing, acquiring a first data lock on a record of the database table corresponding to a missing index entry to prevent modification of the record; and in response to placing the first data lock, adding an index entry for the locked database record to the database index.

13. The non-transitory computer-readable medium of claim 12, wherein the operations further comprise:

in response to acquisition of the first data lock failing, omitting the record of the database table corresponding to the identified missing index entry from consideration during performance of the repair process.

14. The non-transitory computer-readable medium of claim 12, wherein the repair process is performed using one or more transactions that include one or more index entries for repair, wherein the repairing further includes:

releasing one or more data locks on respective database records corresponding to the one or more index entries in a first transaction after completing the first transaction and before beginning a second transaction.

15. The non-transitory computer-readable medium of claim 12, wherein the database table includes records for a plurality of tenants, and wherein the repairing the database index includes repairing index entries for database records of one or more of the plurality of tenants.

16. A system, comprising:
one or more processors; and
one or more storage elements having program instructions stored thereon that are executable by the one or more processors to cause the system to perform operations comprising:
performing a repair process on a database index for a database table, wherein the database index and the database table are data structures maintained by the system, and wherein performing the repair process includes:
placing a first table lock on the database table, wherein the first table lock prevents other processes from modifying the structure of the database table;
scanning the database table to determine a plurality of database records included in the database table;
probing the database index for the plurality of database records to identify database records existing in the database table that are missing corresponding entries in the database index;
based on the probing, placing a first record lock that is different from the first table lock on an identified record of the database table corresponding to a missing index entry, wherein the first record lock prevents other processes from modifying data in the record; and
in response to placing the first record lock, adding an index entry for the locked database record to the database index; and
during performance of the repair process, using the database index to locate one of the plurality of database records included in the database table.

17. The system of claim 16, wherein performing the repair process further includes:

placing a second structural lock on the database index to prevent modifications to the structure of the database index;
scanning the database index to determine a plurality of index entries;
placing record locks on respective database records corresponding to the determined plurality of index entries;
probing the database table for the plurality of index entries to identify incorrect index entries;
based on identifying an incorrect index entry, removing the incorrect entry from the database index; and
during performance of the repair process, modifying one or more records of the database table.

18. The system of claim 17, wherein the operations further comprise:
in response to placement of a record lock failing, releasing one or more previously placed record locks; and
performing another scan of the database index at a location corresponding to the record associated with the failed record-lock placement.

19. The system of claim 16, wherein the operations further comprise:
in response to placement of the first record lock failing, omitting the record of the database table corresponding to the identified missing index entry from consideration during performance of the repair process.

20. The system of claim 16, wherein the repair process is performed using one or more transactions that include one or more index entries for repair, wherein the repairing further includes:
releasing one or more record locks on respective database records corresponding to the one or more index entries in a first transaction after completing the first transaction and before beginning a second transaction.

* * * * *